(12) United States Patent
Jackson

(10) Patent No.: US 8,793,776 B1
(45) Date of Patent: Jul. 29, 2014

(54) LOCATION AS A SECOND FACTOR FOR AUTHENTICATION

(75) Inventor: Dean K. Jackson, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 51 days.

(21) Appl. No.: 13/230,545

(22) Filed: Sep. 12, 2011

(51) Int. Cl.
*G06F 21/31* (2013.01)
*H04W 4/02* (2009.01)
*H04W 4/04* (2009.01)

(52) U.S. Cl.
CPC ............ *H04W 4/023* (2013.01); *H04W 4/04* (2013.01)
USPC .................................................... 726/7

(58) Field of Classification Search
CPC ................................................ H04W 4/023
USPC .................................................... 726/7
See application file for complete search history.

(56) References Cited

U.S. PATENT DOCUMENTS

| | | | |
|---|---|---|---|
| 7,216,361 B1 * | 5/2007 | Roskind et al. | 726/9 |
| 7,428,411 B2 * | 9/2008 | Zellner | 455/419 |
| 2002/0181684 A1 * | 12/2002 | Logan | 379/201.02 |
| 2004/0187018 A1 * | 9/2004 | Owen et al. | 713/200 |
| 2006/0282660 A1 * | 12/2006 | Varghese et al. | 713/155 |
| 2007/0096898 A1 * | 5/2007 | Chou | 340/539.13 |
| 2007/0162597 A1 * | 7/2007 | Tanaka et al. | 709/224 |
| 2008/0126529 A1 * | 5/2008 | Kim et al. | 709/223 |
| 2011/0092185 A1 * | 4/2011 | Garskof | 455/411 |
| 2011/0296513 A1 * | 12/2011 | Kasad | 726/9 |
| 2012/0304260 A1 * | 11/2012 | Steeves et al. | 726/5 |
| 2013/0055370 A1 * | 2/2013 | Goldberg et al. | 726/7 |

* cited by examiner

*Primary Examiner* — Techane Gergiso
(74) *Attorney, Agent, or Firm* — Patent Law Works LLP

(57) ABSTRACT

A system and method for authenticating a log-in request based on location using an authentication application. The authentication application includes a processing unit, a location module, an authentication module, a user interface engine, and a notification module. The processing unit receives a log-in request from a third party application. The processing unit also receives a location of the log-in request and a location of a registered user device. The location module computes a distance between the location of the log-in request and the location of the registered user device. The authentication module determines whether the computed distance exceeds a threshold. The authentication module authenticates the log-in request responsive to determining that the computed distance is within or less than the threshold. The authentication module denies authentication to the log-in request responsive to determining that the computed distance exceeds the threshold.

27 Claims, 5 Drawing Sheets

LOCATION AS A SECOND FACTOR FOR AUTHENTICATION

BACKGROUND

The specification relates to authenticating a log-in request based on location. In particular, the specification relates to authenticating a log-in request based on the location of the log-in request and the location of a user device.

There are a number of email account logins and passwords that are being stolen by keyloggers for account hijacking or takeover to send spam from those accounts. Fraud and unauthorized account use is also on the rise. Imposters or users other than the person that created the account may use systems that require only a login name and a simple password. Due to the increase in fraudulent activities, there is a need to improve authentication of user log-ins.

Systems that only require a username and password are too often compromised and are especially vulnerable given users' tendencies to use the same password for multiple accounts. Even two-level authentication methods that request a piece of personal information, such as the user's school mascot or mother's maiden name are problematic since this information may be publicly available. As a result, improved authentication methods are needed.

SUMMARY OF THE INVENTION

In some examples, the specification describes a system and method for authenticating a log-in request based on location using an authentication application. The authentication application includes a processing unit, a location module, an authentication module, a user interface engine and a notification module. The processing unit receives a log-in request from a third-party application. The processing unit determines a location of the log-in request and a location of a registered user device. In one embodiment, the processing unit receives the location of the user device from a device application stored on the user device.

The location module computes a distance between the location of the log-in request and the location of the registered user device. In one embodiment, the distance is a geographical distance. The authentication module determines whether the computed distance exceeds a threshold. If the computed distance is within or less than the threshold, the authentication module authenticates the log-in request. If the computed distance exceeds the threshold, the authentication module denies authentication. In one embodiment, if the authentication module denies authentication to the log-in request, the notification module transmits a warning notification to the registered user device.

In one embodiment, the user interface engine generates a user interface that requests a response from a user that submitted the log-in request. The authentication module authenticates the log-in request responsive to determining that the response from the user matches a response stored on a user profile for the user. The authentication module denies authentication responsive to determining that the response from the user does not match the response stored on the user profile for the user. The authentication application provides an additional level of security to avoid fraudulent activity. In one embodiment, the authentication application performs authentication for a financial transaction.

In one embodiment, the processing unit determines a location where a user is logged-in to a third-party application. The processing unit also receives the location of a registered user device. The location module computes a distance between the location where the user is logged-in to the third-party application and the location of the registered user device. The authentication module determines whether the computed distance exceeds the threshold. The authentication module logs-out the user from the third-party application responsive to determining that the computed distance exceeds the threshold.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
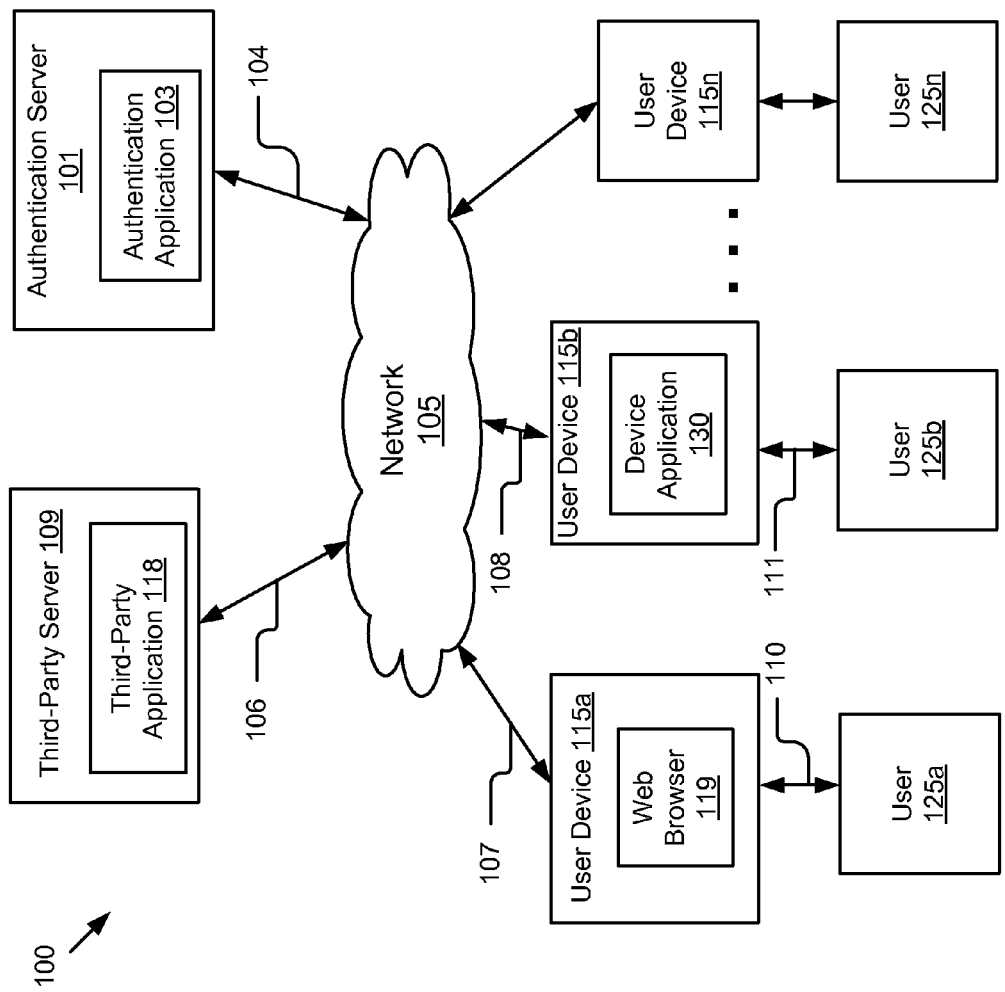
FIG. 1 is a block diagram illustrating one embodiment of a system for authenticating a log-in request based on location.

A system and method for authenticating a log-in request based on location is described below. In the following description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for authenticating a log-in request based on location according to one embodiment. The system 100 includes user devices 115a, 115b, 115n that are accessed by users 125a, 125b, 125n, a third-party server 109 and an authentication server 101. In FIG. 1 and the remaining figures, a letter after a reference number, such as "115a" is a reference to the element having that particular reference number. A reference number in the text without a following letter, such as "115," is a general reference to any or all instances of the element bearing that reference number. In the illustrated embodiment, these entities are communicatively coupled via a network 105.

The network 105 is a conventional type, wired or wireless, and may have any number of configurations such as a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or includes portions of a telecommunications network for sending data in a variety of different communication protocols. In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc. While only one network 105 is coupled to the user devices, 115a, 115b, 115n, the third-party server 109 and the authentication server 101, in practice any number of networks 105 can be connected to the entities.

The user device 115a, 115b, 115n is any computing device that includes a memory and a processor such as a personal computer, a laptop, a tablet or a mobile device such as a cellular phone, a personal digital assistant or a smart phone. The user devices 115a, 115b, 115n are connected to the network 105 via signal lines 107, 108 respectively. The users 125a, 125b, 125n interact with the user devices 115a, 115b, 115n via signal lines 110, 111 respectively. Although only three user devices 115a, 115b, 115n are illustrated, persons of ordinary skill in the art will recognize that any number of user devices 115n are available to any number of users 125n.

In one embodiment, the user device 115a includes a web browser 119. The web browser 119 is code and routines stored in a memory and executed by a processor of the user device 115a. For example, the browser 119 is a browser application that loads websites hosted by a website server (not shown). In one embodiment, the user 125a accesses a third-party application 118 stored on the third-party server 109 using the web browser 119. In another embodiment, the user 125a accesses a third-party application (not shown) stored on the user device 115a.

In one embodiment, the user device 115b includes a device application 130. The device application 130 determines the user device's 115a location and transmits the location to the authentication server 101 either in response to a request or periodically. The location is a record of where the user device 115a was at a given time. In one embodiment the location includes latitude, longitude and a timestamp. In another embodiment, the location also includes details about the position of the user device 115a at that time, such as altitude or metadata about how the position itself was captured, such as accuracy. The device application 130 determines the location from a variety of different sources, such as a global positioning system (GPS), cell-phone tower information, an internet protocol (IP) address received from the browser 119, WiFi information, etc. In one embodiment, the device application 130 receives a request and an access token from the authentication server 101 and the device application 130 confirms the authenticity of the access token before transmitting the user's location. The access token helps confirm that the device application 130 does not reveal the user's location to an unauthorized party.

In one embodiment, the device application 130 is on the same user device 115a that stores the web browser 119. For example, the user accesses the web browser 119 is on a smartphone that is also a registered user device 115a that is associated with the user's profile.

The third-party server 109 is a hardware server device that includes a third-party application 118. In one embodiment, the third-party server 109 sends and receives data to and from one or more user devices 115a, 115b, 115n via the network 105. For example, the third-party server 109 is a hardware server for generating a personalized website to the user devices 115a, 115b, 115n. A person with ordinary skill in the art will recognize that the third-party server 109 can be configured to provide different services and/or functionalities to the user devices 115a, 115b. The third-party server 109 is connected to the network 105 via signal line 106. Although only one third-party server 109 and only one third-party application 118 are shown, persons of ordinary skill in the art will recognize that multiple third-party servers 109 including multiple third-party applications 118 may be present.

The third-party application 118 is software for performing a service, a task or an activity known to a person with ordinary skill in the art, for example, an email application, a financial application, a data management application, a document processing application, an entertainment application, a social networking application, etc. In one embodiment, the third-party application 118 receives a log-in request from a user. The third-party application 118 transmits a log-in request to the authentication application 103 that includes the username and password for the user. In another embodiment, the authentication application 103 generates a user interface that is displayed as part of the website generated by the third-party application 118. The user inputs the username and password into the user interface generated by the authentication application 103, the authentication application logs-in the user and transmits a confirmation to the third-party application 118. In one embodiment, the third-party application 118 generates a webpage for logging-in users. In another embodiment, the third-party application 118 is software for performing a financial transaction such as on an Automated Teller Machine or in a store for making a purchase.

The authentication server 101 is a hardware server device that includes an authentication application 103. The authentication application 103 is software for authenticating requests submitted by the users 125a, 125b, 125n to log-in to a third-party application 118. In one embodiment, the authentication application 103 provides a universal log-in service for multiple third-party servers 109 by authenticating log-in requests for multiple websites with the same user information. In another embodiment, the authentication application 103 logs a user 125a, 125b, 125n out of a third-party application 118. The authentication application 103 sends and receives data to and from the user devices 125a, 125b, 125n and the third-party server 109 via the network 105. The authentication sever 101 is connected to the network 105 via signal line 104. In one embodiment, both the authentication application 103 and the third-party application 118 are on the same server.

Authentication Application 103

Figure 2:
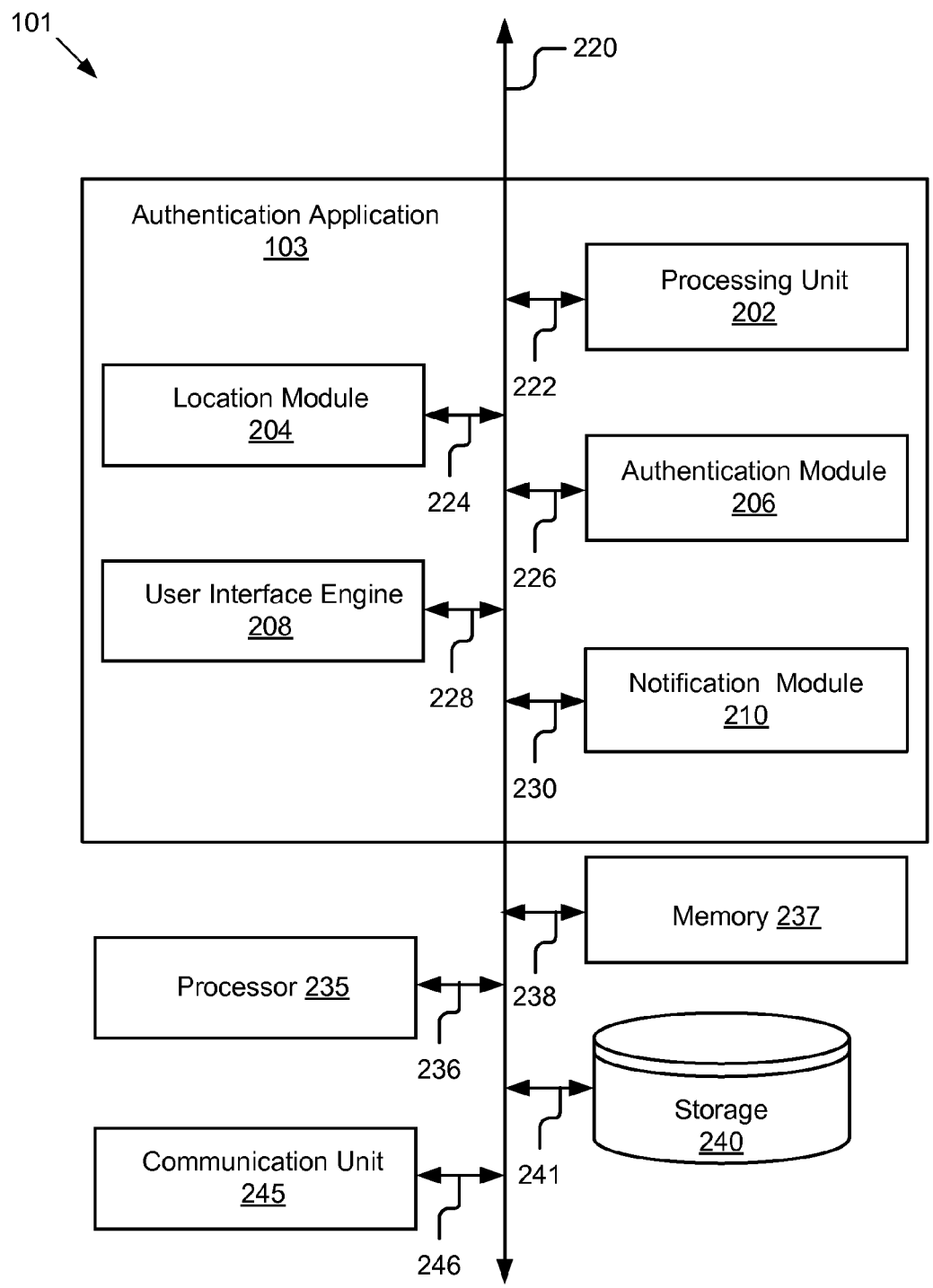
FIG. 2 is a block diagram illustrating one embodiment of an authentication application.

Referring now to FIG. 2, the authentication application 103 is shown in detail. FIG. 2 is a block diagram of an authentication server 101 that includes the authentication application 103, a memory 237, a processor 235, storage 240 and a communication unit 245.

The processor 235 comprises an arithmetic logic unit, a microprocessor, a general purpose controller or some other processor array to perform computations and provide electronic display signals to a display device. The processor 235 is coupled to the bus 220 for communication with the other components via signal line 236. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 237 stores instructions and/or data that may be executed by processor 235. The memory 237 is coupled to the bus 220 for communication with the other components via signal line 238. The instructions and/or data may comprise code for performing any and/or all of the techniques described herein. The memory 237 may be a dynamic random access memory (DRAM) device, a static random access memory (SRAM) device, flash memory or some other memory device known in the art. In one embodiment, the memory 237 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The storage 240 is a non-transitory memory that stores data necessary for the functionality of the authentication application 103. The storage 240 is coupled to the bus 220 via signal line 241. The storage 240 stores user profiles that include user information and user settings. The user information and user settings are received by the storage 240, for example, when a user 125 registers with a third-party application 118. A user profile stored in the storage 240 includes usernames, passwords, user responses (for example, responses given by a user 125 to a security question during registration with a third-party application 118), access tokens associated with each user, codes (for example, a pin number), biometrics of the user 125, thresholds, email address, modes of communication with the user 125, etc. Additionally, each user profile includes an identifier of a user device 115 that is registered with a third-party application 118. The registered user device 115 is, for example, a smart phone that will be in the user's possession at all times.

The authentication application 103 transmits and receives data to and from the registered user device 115 such as a notification, a reminder, a location of the registered user device 115, etc. In one embodiment, the storage 240 updates the user profile with new information, such as an updated password, a new user device 115, etc.

The communication unit 245 transmits and receives data (for example, log-in requests, location information, notifications, etc.) to and from the user device 115 and the third-party server 109. The communication unit 245 is coupled to the bus 220 via signal line 246. In one embodiment, the communication unit 245 includes a port for direct physical connection to the user device 115, the third-party server 109 or to another communication channel. For example, the communication unit 245 includes a USB, SD, CAT-5 or similar port for wired communication with the user device 115. In another embodiment, the communication unit 245 includes a wireless transceiver for exchanging data with the user device 115, the third-party server 109 or any other communication channel using one or more wireless communication methods, such as IEEE 802.11, IEEE 802.16, BLUETOOTH® or another suitable wireless communication method.

In yet another embodiment, the communication unit 245 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 245 includes a wired port and a wireless transceiver. The communication unit 245 also provides other conventional connections to the network for distribution of files and/or media objects using standard network protocols such as TCP/IP, HTTP, HTTPS and SMTP as will be understood to those skilled in the art.

In one embodiment, the authentication application 103 comprises a processing unit 202, a location module 204, an authentication module 206, a user interface engine 208 and a notification module 210 that are each coupled to the bus 220.

The processing unit 202 is software including routines for receiving log-in requests and location information and for transmitting information, such as confirmation of a log-in via the communication unit 245. In one embodiment, the processing unit 202 is a set of instructions executable by the processor 235 to provide the functionality described below for receiving log-in requests and location information. In another embodiment, the processing unit 202 is stored in the memory 237 of the authentication server 101 and is accessible and executable by the processor 235. In either embodiment, the processing unit 202 is adapted for cooperation and communication with the processor 235, the communication unit 245, the location module 204, the authentication module 206, the notification module 210 and other components of the authentication server 101 via signal line 222.

The processing unit 202 receives log-in requests that include user information (for example, username, password, etc.), a time and a location of the log-in request. The location of the log-in request is, for example, the location of the web browser 119 stored on the user device 115a that a user 125a accesses to submit the log-in request. In one embodiment, the processing unit 202 receives the log-in requests from the third-party server 109. In this embodiment, a user 125, for example, submits a log-in request to access a third-party application 118 stored in the third-party server 109 using the web browser 119 or any other application stored in the user device 115. In one embodiment, the processing unit 202 receives log-in requests from multiple third-party applications 118 for logging in the same user 125. In this example, the authentication application 103 acts as a universal authenticator. In yet another embodiment, the processing unit 202 receives the log-in request directly from the user device 115. In this embodiment, a user 125 submits a log-in request to access a third-party application (not shown) stored in the user device 115 or the user submits a log-in request to the website generated by the third-party application 118 that includes a snippet of code that calls the authentication application 103 directly instead of going through the third-party application 118.

The processing unit 202 also determines the location of the registered user device 115 that is registered with the third-party application 118. In one embodiment, the processing unit 202 receives the location from the device application 130 stored on the user device 115. The authentication application 103 uses the location determined from the registered user device 115 for authenticating the log-in request. A person with ordinary skill in the art will recognize that in one embodiment, a user 125 submits the log-in request using the registered user device 115.

In one embodiment, the processing unit 202 receives the location of the registered user device 115 periodically, for example, every 15 minutes, every hour, etc. In another embodiment, the processing unit 202 receives the location of the registered user device 115 by sending a request to the registered user device 115. In this embodiment, the processing unit 202 sends the request for the location to the registered user device 115 responsive to receiving a log-in request. The processing unit 206 sends a request for the location to the registered user device 115 via the communication unit 245.

The location of the log-in request and the location of the registered user device 115 are received in any format known to one with ordinary skill in the art such as an Internet Protocol (IP) address, a Media Access Control (MAC) address, a location determined using a geo-location application, a location determined using a Global Positioning System (GPS), a location determined using Radio Frequency Identification (RFID), a location determined using multilateration, etc. In one embodiment, the location information includes a time that the location was recorded.

The location module 204 is software including routines for computing the distance between the location of the log-in request and the location of the registered user device 115. In one embodiment, the location module 204 is a set of instructions executable by the processor 235 to provide the functionality described below for computing the distance. In another embodiment, the location module 204 is stored in the memory 237 of the authentication server 101 and is accessible and executable by the processor 235. In either embodiment, the location module 204 is adapted for cooperation and communication with the processor 235, the processing unit 202, the authentication module 206 and other components of the authentication server 101 via signal line 224.

The location module 204 receives the location of the log-in request and the location of the registered user device 115 from the processing unit 202 and computes the distance between them. In one embodiment, the distance is a geographical location. The location module 204 computes the distance each time a new location of the registered user device 115 is received by the processing unit 202. In one embodiment, the location of the log-in request and the location of the registered user device 115 are received in different formats. In this embodiment, the location module 204 converts the received locations to a standard format and computes the distance. The location module 204 sends the computed distance to the authentication module 206.

The authentication module 206 is software including routines for registering users and authenticating log-in requests. In one embodiment, the authentication module 206 is a set of instructions executable by the processor 235 to provide the functionality described below for authenticating a log-in request. In another embodiment, the authentication module 206 is stored in the memory 237 of the authentication server 101 and is accessible and executable by the processor 235. In either embodiment, the authentication module 206 is adapted for cooperation and communication with the processor 235, the storage 240, the processing unit 202, the location module 204, the notification module 210, the user interface engine 208 and other components of the authentication server 101 via signal line 226.

The authentication module 206 receives user information for establishing a user profile, such as usernames, passwords, user responses (for example, responses given by a user 125 to a security question during registration with a third-party application 118), access tokens associated with each user, codes (for example, a pin number), biometrics of the user 125, thresholds, email address, modes of communication with the user 125, etc. The authentication module 206 receives the user device's 115 unique identifier (e.g. the Unique Device Identifier) and establishes a registered user device 115 by associating the unique identifier with the user profile. The authentication module 206 saves the user profile in the storage 240.

According to one embodiment, the authentication module 206 receives the user information included in the log-in request from the processing unit 202. The authentication module 206 identifies a user profile stored in the storage 240 that is associated with the user name included in the received user information. The authentication module 206 then determines whether the received user information (for example, a password, a code, etc.) matches the user information stored in the user profile.

The authentication module 206 also receives the computed distance from the location module 204 and determines whether the computed distance exceeds or is within or less than a threshold. In one embodiment, the threshold is set by either the authentication server 101 or the third-party server 109 for the third-party applications 118. In another embodiment, a user 125 sets the thresholds for the third-party applications 118. For example, a user 125 sets the threshold while registering for the third-party application 118. In either embodiment, the threshold can be common for all the third-party applications 118 or different for each of the third-party applications 118.

The authentication module 206 authenticates the log-in request responsive to determining that the received user information matches the user information stored in the user profile and that the computed distance is within or less than the threshold. The authentication module 206 denies authentication responsive to determining that the received user information does not match the user information stored in the user profile and/or that the computed distance exceeds the threshold.

In another embodiment, the authentication module 206 sends a message to the user interface engine 208 to generate a user interface requesting additional information from the user 125, such as the answer to security questions. The authentication module 206 receives the additional information and determines whether it matches with the user information stored in the user profile. The authentication module 206 authenticates the log-in request if the additional information matches the user information stored in the user profile. The authentication module 206 denies authentication if the additional information does not match the user information stored in the user profile. The authentication module 206, for example, requests for additional information when a user 125 opts-out from authentication based on location. In some examples, a user 125 may opt-out from authentication based on location, for example, when a user submits a log-in request via a remote desktop application stored on the user device 115. In this scenario, the authentication module 206 would deny authentication because the distance between the location of the log-in request (i.e., the location of the remote desktop) and the location of the registered user device 115 would exceed the threshold. In one embodiment, the authentication application 103 authenticates such a log-in request only when a user 125 submits the log-in request using the remote desktop application that is stored on the registered user device 115. A person with ordinary skill in the art would recognize that the authentication module 206 requests for additional information from a user 125 not only when the user opts-out from authentication based on location, but also in other situations where, for example, the received user information included in the log-in request is insufficient, the computed distance is close (for example, within a few feet or 500 yards) to the threshold, etc.

In one embodiment, once the log-in request is authenticated, the authentication module 206 continues to receive the computed distance between the location of the log-in request and the location of the registered user device 115 from the location module 204. The authentication module 206 automatically logs-out the user 125 (i.e., denies authentication) from the third-party application 118 once the distance exceeds the threshold. This is advantageous in situations, for example, when a user 125 forgets to log-out from an email application that he had accessed from a desktop 115a at work. In this example, the registered user device is a smart phone 115b that the user 125 possesses at all times. Once the user 125 travels a distance from his workplace that exceeds the threshold, the authentication module 206 automatically logs-out the user from the email application. In one embodiment, the authentication module 206 automatically receives the computed distance from the location module 204 each time there is a change in the location of the registered user device 115 received by the processing unit 202. In another embodiment, in order to receive the computed distance, the authentication module 206 periodically notifies the processing unit 202 to transmit a message to the registered user device 115 requesting its location.

The user interface engine 208 is software including routines for generating a user interface. In one embodiment, the user interface engine 208 is a set of instructions executable by the processor 235 to provide the functionality described below for generating a user interface. In another embodiment, the user interface engine 208 is stored in the memory 237 of the authentication server 101 and is accessible and executable by the processor 235. In either embodiment, the user interface engine 208 is adapted for cooperation and communication with the processor 235, the storage 240, the communication unit 245, the authentication module 206 and other components of the authentication server 101 via signal line 228.

The user interface engine 208 generates a user interface for registering a user. The user interface asks for usernames, passwords, user responses (for example, responses given by a user 125 to a security question during registration with a third-party application 118), email address, modes of communication with the user 125, identifying information for the user devices 115 being registered, etc. The user interface also allows the user to set preferences for different third-party applications 118. For example, in one embodiment financial applications are set to have a lower threshold than newsfeed applications because it is more important to prevent fraudulent activity in a financial application. In another embodiment, the user interface allows the user to set a temporary pause in activation of the authentication application 103, for example, in the event that the user is leaving the area for a short amount of time to take a vacation or because the user went to work and forgot her phone at home.

In one embodiment, the user interface engine 208 generates a user interface that is displayed on a website generated by the third-party application 118 that requests log-in information. Once the user inputs the log-in information, the processing unit 202 receives the log-in information and transmits it to the authentication module 206 for authentication.

If the log-in information is insufficient, the difference between the two locations exceeds a threshold or the authentication application 103 uses multiple levels of authentication, the user interface engine 208 generates a user interface for requesting additional information from the user. The user interface engine 208 is prompted after receiving a message from the authentication module 206 to generate a user interface requesting additional information from the user 125. The user interface engine 208 generates the user interface and transmits it via the communication unit 245 to the registered user device 115. In another embodiment, the user interface is transmitted for display on the third-party website. The user interface requests additional information that is stored in the user profile for the user 125, for example, a biometric response, a response to a security question, etc. The processing unit 202 receives the user's response via the communication unit 245 and transmits it to the authentication module 206.

The notification module 210 is software including routines for transmitting a notification to the registered user device 115. In one embodiment, the notification module 210 is a set of instructions executable by the processor 235 to provide the functionality described below for transmitting a notification. In another embodiment, the notification module 210 is stored in the memory 237 of the authentication server 101 and is accessible and executable by the processor 235. In either embodiment, the notification module 210 is adapted for cooperation and communication with the processor 235, processing unit 208, the communication unit 245, the authentication module 206 and other components of the authentication server 101 via signal line 230.

According to one embodiment, the authentication module 206 sends a message to the notification module 210 responsive to denying authentication to a log-in request. The notification module 210 receives the message, identifies the registered user device 115 from the user profile stored in storage 240 and transmits a warning notification to the registered user device 115. The warning notification includes information such as the location and time of the log-in request that is received from the processing unit 202, a link to change a setting associated with the third-party application 118 (for example, a password, temporarily suspend the account with a third-party application 118, etc.). In a further embodiment, the notification module 210 retrieves the mode of communication preferred by a user 125 from the user profile in the storage 240 and transmits the warning notification accordingly. For example, the notification module 210 transmits the warning notification as a text message, a push notification, a voice mail, etc. In another embodiment, the notification module 210 transmits the warning notification as an email to the email address stored in the user profile.

Methods

Figure 3:
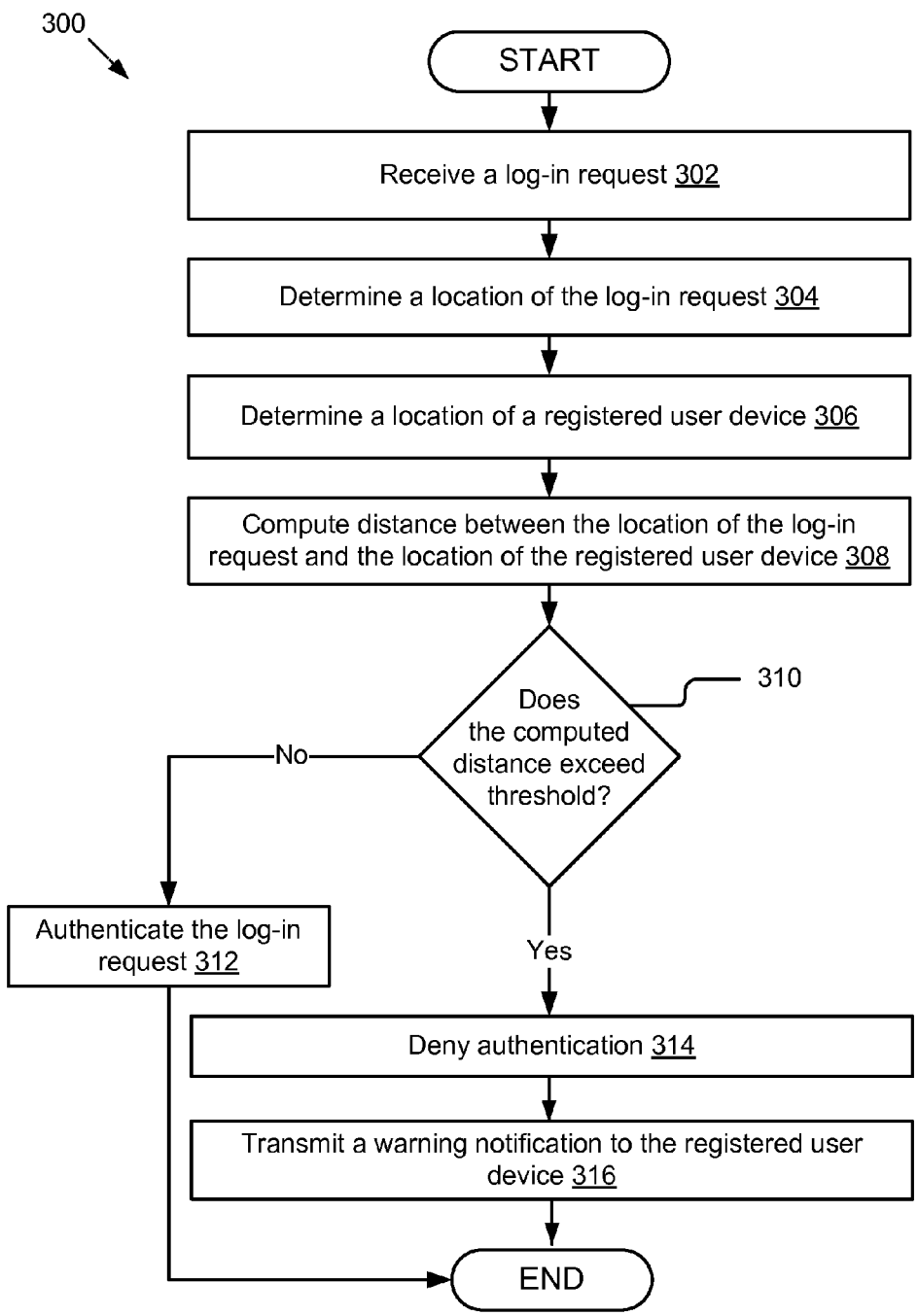
FIG. 3 is a flow diagram of one embodiment of a method for authenticating a log-in request based on location.
Figure 4:
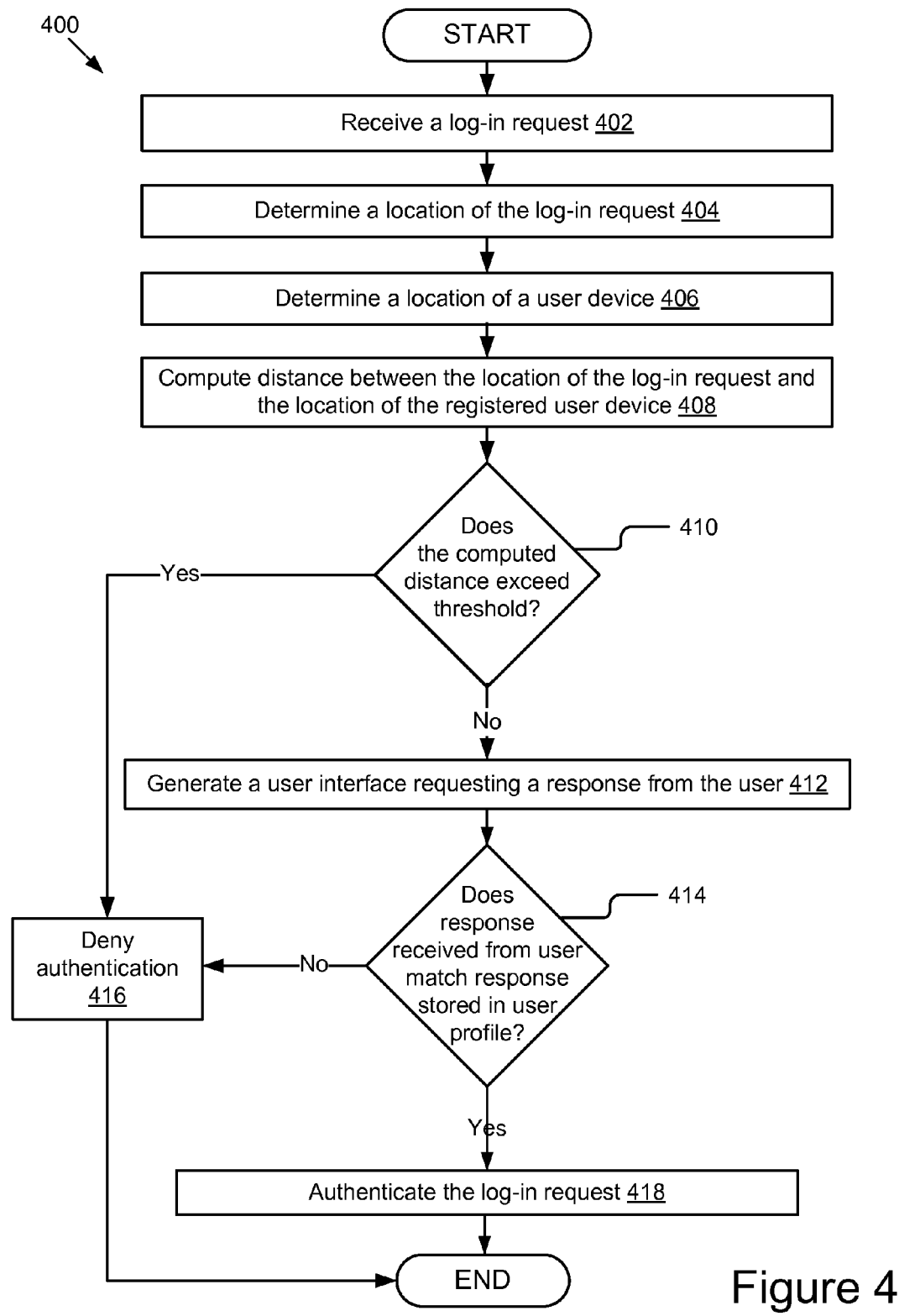
FIG. 4 is a flow diagram of another embodiment of a method for authenticating a log-in request based on location.
Figure 5:
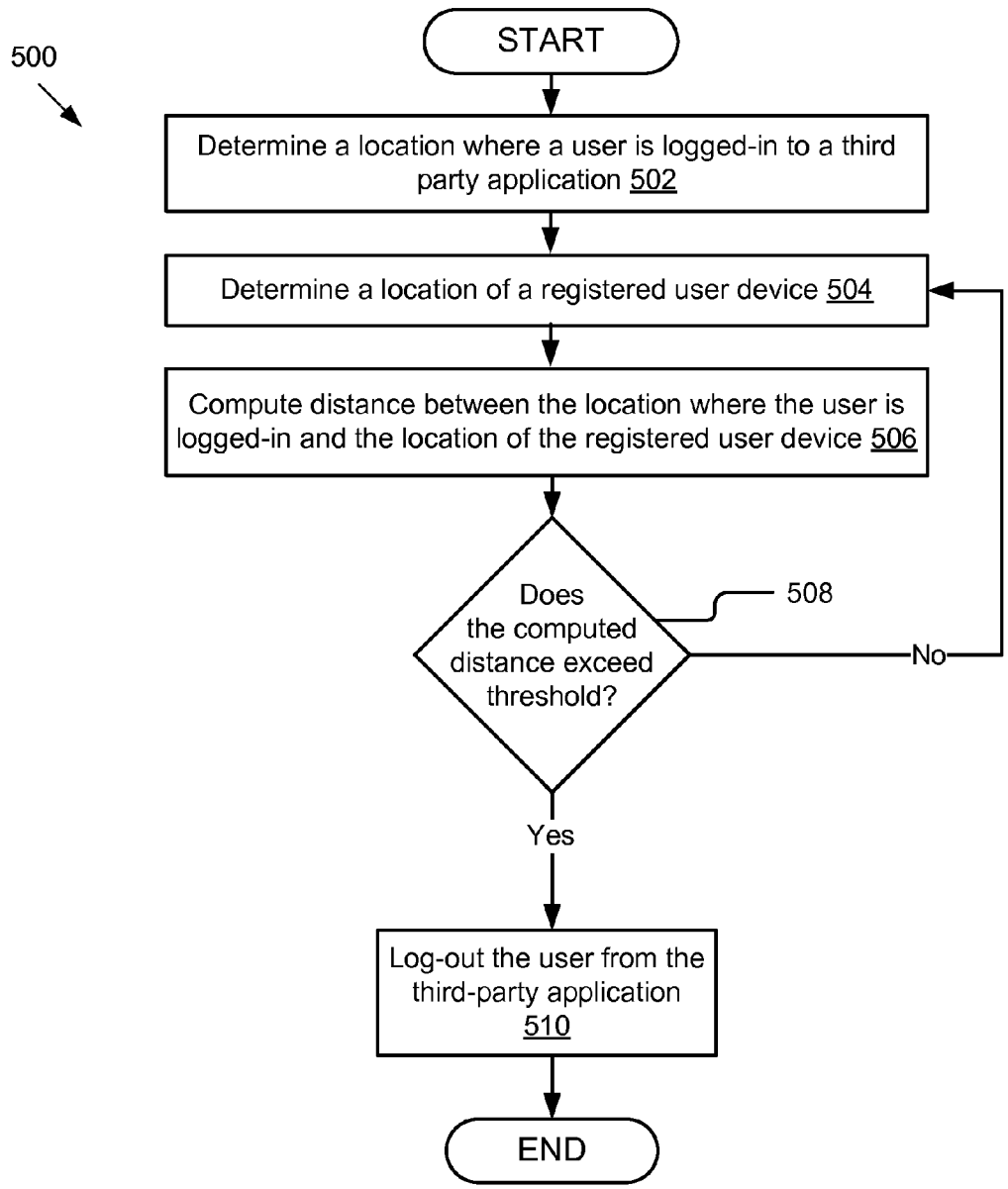
FIG. 5 is a flow diagram of one embodiment of a method for automatically logging-out a user based on location.

Referring now to FIGS. 3-5, various embodiments of the methods for authenticating log-in requests and logging-out a user from third-party applications will be described. FIG. 3 is a flow diagram 300 of one embodiment of a method for authenticating a log-in request based on location. The processing unit 202 receives 302 a log-in request from a third-party application 118 or a user device 115a. The processing unit 202 then determines 304 the location of the log-in request, for example, the location of the user device 115a with which a user 125a submits the log-in request. In one embodiment, the processing unit 202 determines the location based on an IP address of the browser that the user accessed. The processing unit 202 also receives data from the user device 115b and determines 306 the location of the registered user device 115b based on the data. In one embodiment, the processing unit 202 determines the location based on GPS data, cellular tower information or WiFi data. In one embodiment, the authentication module 206 transmitted a request for the user device 115b location along with an access token that verifies that the authentication application 103 has permission to request the user device's 115b location. A person with ordinary skill in the art would recognize that in one embodiment, a user 125 may submit the log-in request using the registered user device 115b.

The processing unit 202 transmits the locations to the location module 204, which computes 308 the distance between the location of the log-in request and the location of the registered user device 115b. In one embodiment, the distance is a geographical distance. The location module 204 transmits the distance to the authentication module 206, which determines 310 whether the computed distance exceeds the threshold. The authentication module 206 retrieves the threshold from the storage 240. The authentication module 206 receives the log-in request from the processing unit 202 and compares the log-in information, such as the username and password, to the user profile. The authentication module 206 authenticates 312 the log-in request in response to determining that the computed distance is within or less than the threshold. The authentication module 206 denies 314 authentication to the log-in request in response to determining that the computed distance exceeds the threshold.

If the log-in request failed, the authentication module 206 instructs the notification module 210 to transmit 316 a warning notification to the registered user device 115b. The warning notification includes, for example, a time and the location of the log-in request.

In one embodiment, the authentication application 103 authenticates a financial transaction, such as a transfer of funds to a bank account using a financial application, a point-of-sale financial transaction, a debit card transaction using an Automated Teller Machine (ATM), etc. In this example the third-party application 118 includes the ATM or the point-of-sale financial transaction, but instead of logging-in to a website, the third-party application 118 requests authentication from the authentication application 103 in response to the user making a purchase or a withdrawal and providing user information to the ATM, a bank teller, a sales associate, etc. An example use of the method described above is as follows: A user 125, who is currently in a foreign country on a holiday, submits a log-in request to make a financial transaction. The authentication application 103 receives the location of the log-in request and the location of a smartphone (a registered user device 115) that the user possesses. The authentication application 103 determines that the distance between them is within or less than the threshold and authenticates the log-in request. In another embodiment, the financial application is stored on the same user device 115 that stores the device application 130.

FIG. 4 is a flow diagram 400 of another embodiment of a method for authenticating a log-in request based on location. The processing unit 202 receives 402 a log-in request from a third-party application 118 or a user device 115. The processing unit 202 then determines 404 the location of the log-in request. The processing unit 202 also receives data about the registered user device 115 and determines 406 the location of the registered user device 115 that is associated with the user. The location of the registered user device 115 allows the processing unit 202 to confirm the user's location because the user should be near the user device 115. In one embodiment, the device application 103 transmits the location of the user device 115. In another embodiment, if the user device 115 is not transmitting information, for example, because the user device 115 was turned off, the processing unit 202 retrieves the last known user device 115 location from storage 240.

The processing unit 202 transmits the location information to the location module 204, which computes 408 the distance between the location of the log-in request and the location of the registered user device 115. The location module 204 transmits the distance to the authentication module 206, which determines 410 whether the computed distance exceeds the threshold. The authentication module 206 denies 416 authentication in response to determining that the computed distance exceeds the threshold. The authentication module 206, in response to determining that the computed distance is within or less than the threshold, sends a message to the user interface engine 208 to generate a user interface requesting additional information 412 from the user 125. The user interface engine 208 generates 414 a user interface requesting a response from the user 125 that is transmitted to the third-party application 118 or the registered user device 115 via the communication unit 245.

The processing unit 202 receives a response from the user 125 and transmits the response to the authentication module 206, which determines 414 whether the response received from the user 125 matches the response stored in the user profile. The authentication module 206 denies 416 authentication responsive to determining that the response received from the user 125 does not match the response stored in the user profile. The authentication module 206 authenticates 418 the log-in request responsive to determining that the response received from the user 125 matches the response stored in the user profile.

FIG. 5 is a flow diagram 500 of one embodiment of a method for automatically logging-out a user based on location. In this embodiment, a user 125 is already logged-in to a third-party application 118. The processing unit 202 determines 502 the location where the user 125 is logged in to a third-party application 118. For example, the processing unit 202 receives the IP address from the browser 119. The processing unit 202 also receives 504 the location of the registered user device 115. In this embodiment, the processing unit 202 sends a request periodically to the registered user device 115 for its location via the communication unit 245. The location module 204 computes 506 the distance between the location where the user 125 is logged-in and the location of the registered user device 115. The authentication module 206 then determines 508 whether the computed distance exceeds the threshold. The authentication module 206 logs-out 510 the user 125 from the third-party application 118 responsive to determining that the computed distance exceeds the threshold. This helps protect against people accessing the user's information when the user is not present. The authentication application 103 repeats steps 504-508 in response to determining that the computed distance is within or less than the threshold.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment.

Accordingly, the disclosure is intended to be illustrative, but not limiting, of the scope of the specification, which is set forth in the following claims.

What is claimed is:

1. A method for authenticating a log-in request based on location, the method comprising:
receiving, with one or more processors, a log-in request from a first user device;
determining, with the one or more processors, a first location and a time of the log-in request received from the first user device;
determining, with the one or more processors, a current location of a registered mobile user device;
computing, with the one or more processors, a distance between the first location of the log-in request and the current location of the registered mobile user device;
determining, with the one or more processors, whether the computed distance exceeds a threshold;
authenticating, with the one or more processors, the log-in request responsive to determining that the computed distance is within or less than the threshold; and
transmitting, with the one or more processors, a warning notification to the registered mobile user device, the warning notification including the first location and the time of the log-in request received from the first user device responsive to determining that the computed distance exceeds the threshold.

2. The method of claim 1, further comprising denying authentication to the log-in request responsive to determining that the computed distance exceeds the threshold.

3. The method of claim 2, wherein the warning notification to the registered mobile user device includes a link to modify a setting of a third party application for which the log-in request was received.

4. The method of claim 1, wherein the first location of the log-in request is determined based at least in part on an internet protocol address of a browser running on the first user device.

5. The method of claim 1, further comprising generating a user interface that requests a response from a user that submitted the log-in request.

6. The method of claim 5, wherein the response is at least one of a biometric response, a response to a question, and a code.

7. The method of claim 5 further comprising:
receiving the response from the user;
authenticating the log-in request responsive to determining that the response from the user matches a response stored on a user-profile of the user; and
denying authentication to the log-in request responsive to determining that the response from the user does not match the response stored on the user-profile of the user.

8. The method of claim 1, wherein the current location of the registered mobile user device is at least one from the group of an Internet Protocol (IP) address, a media access control (MAC) address, a location determined using a geo-location application, a location determined using global positioning system (GPS) and a location determined using radio frequency identification (RFID).

9. The method of claim 1, further comprising transmitting a request for the current location of the registered mobile user device and an access token to the registered mobile user device.

10. The method of claim 1, wherein the first location of the log-in request is the first location of the first user device with which a user submits the log-in request.

11. The method of claim 1, further comprising receiving a log-in request for a financial transaction.

12. The method of claim 1, wherein the distance is a geographical distance.

13. A system for authenticating a log-in request based on location, the system comprising:
one or more processors;
a processing unit stored on a memory and executable by the one or more processors, the processing unit for receiving a log-in request from a first user device, determining a first location and a time of the log-in request received from the first user device and determining a current location of a registered mobile user device;
a location module stored on the memory and executable by the one or more processors, the location module coupled to the processing unit for computing a distance between the first location of the log-in request and the current location of the registered mobile user device; and
an authentication module stored on the memory and executable by the one or more processors, the authentication module coupled to the location module for determining whether the computed distance exceeds a threshold and authenticating the log-in request responsive to determining that the distance is within or less than the threshold; and
a notification module stored on the memory and executable by the one or more processors, the notification module coupled to the authentication module for transmitting a warning notification to the registered mobile user device, the warning notification including the first location and the time of the log-in request received from the first user device responsive to determining that the computed distance exceeds the threshold.

14. The system of claim 13, wherein the authentication module denies authentication to the log-in request responsive to determining that the computed distance exceeds the threshold.

15. The system of claim 13, wherein the warning notification to the registered mobile user device includes a link to modify a setting of a third party application for which the log-in request was received.

16. The system of claim 13, wherein the processing unit determines the current location of the log-in request based at least in part on an internet protocol address of a browser running on the first user device.

17. The system of claim 13, further comprising a user interface engine for generating a user interface that requests a response from a user that submitted the log-in request.

18. The system of claim 17, wherein the response is at least one of a biometric response, a response to a question, and a code.

19. The system of claim 17, wherein the authentication module further authenticates the log-in request responsive to determining that the response from the user matches a response stored on a user-profile of the user and denies authentication to the log-in request responsive to determining that the response from the user does not match the response stored on the user-profile of the user.

20. The system of claim 19, further comprising a storage for storing the user-profile.

21. The system of claim 13, wherein the current location of the registered mobile user device is at least one from the group of an Internet Protocol (IP) address, a media access control (MAC) address, a location determined using a geo-location application, a location determined using global positioning system (GPS) and a location determined using radio frequency identification (RFID).

22. The system of claim 13, wherein the processing unit transmits a request for the registered mobile user device's current location and an access token to the registered mobile user device.

23. A computer program product comprising a non-transitory computer useable medium including a computer readable program, wherein the computer readable program when executed on a computer causes the computer to:
receive a log-in request from a first user device;
determine a first location and a time of the log-in request received from the first user device;
determine a current location of a registered mobile user device;
compute a distance between the first location of the log-in request and the current location of the registered mobile user device;
determine whether the computed distance exceeds a threshold; and
authenticate the log-in request responsive to determining that the computed distance is within or less than the threshold; and
transmitting a warning notification to the registered mobile user device, the warning notification including the first location and the time of the log-in request received from the first user device responsive to determining that the computed distance exceeds the threshold.

24. The computer program product of claim 23, further causing the computer to deny authentication to the log-in request responsive to determining that the computed distance exceeds the threshold.

25. A method for automatically logging-out a user based on location, the method comprising:
determining a first location where the user is logged-in to a third-party application, the first location being associated with a first device;
determining a current location of a registered mobile user device;

computing a distance between the first location where the user is logged-in to the third party application and the current location of the registered mobile user device;

determining whether the computed distance exceeds a threshold; and logging-out the user from the third-party application responsive to determining that the computed distance exceeds the threshold.

26. A system for automatically logging-out a user based on location, the system comprising:

one or more processors;

a processing unit stored on a memory and executable by the one or more processors, the processing unit for determining a first location where the user is logged-in to a third party application, the first location being associated with a first device and determining a current location of a registered mobile user device;

a location module stored on the memory and executable by the one or more processors, the location module coupled to the processing unit for computing a distance between the first location where the user is logged-in to the third party application and the current location of the registered mobile user device; and an authentication module stored on the memory and executable by the one or more processors, the authentication module coupled to the location module for determining whether the computed distance exceeds a threshold and logging-out the user from the third party application responsive to determining that the computed distance exceeds the threshold.

27. A computer program product comprising a non-transitory computer useable medium including a computer readable program, wherein the computer readable program when executed on a computer causes the computer to:

determine a first location where a user is logged-in to a third party application, the first location being associated with a first device;

determine a current location of a registered mobile user device;

compute a distance between the first location where the user is logged-in to the third party application and the current location of the registered mobile user device;

determine whether the computed distance exceeds a threshold; and log-out the user from the third-party application responsive to determining that the computed distance exceeds the threshold.

* * * * *